United States Patent
Okabayshi et al.

(10) Patent No.: US 6,726,029 B2
(45) Date of Patent: Apr. 27, 2004

(54) SEPARATOR SCREEN WITH SOLIDS CONVEYING END AREA

(75) Inventors: Howard Hiroshi Okabayshi, Spring, TX (US); Thomas C. Adams, Hockley, TX (US); Guy L. McClung, III, Spring, TX (US)

(73) Assignee: Varco I/P, Inc., Houston, TX (US)

( * ) Notice: Subject to any disclaimer, the term of this patent is extended or adjusted under 35 U.S.C. 154(b) by 0 days.

(21) Appl. No.: 10/167,978

(22) Filed: Jun. 12, 2002

(65) Prior Publication Data

US 2003/0230526 A1 Dec. 18, 2003

(51) Int. Cl.$^7$ ............................ B07B 1/40; B01D 33/03
(52) U.S. Cl. ................... 210/388; 210/483; 209/261; 209/401; 209/403; 209/405; 209/412
(58) Field of Search ................. 210/359, 388, 210/232, 483; 209/261, 397, 403, 405, 401, 409, 412

(56) References Cited

U.S. PATENT DOCUMENTS

| | | | | |
|---|---|---|---|---|
| 179,252 A | * | 6/1876 | Asbury | 209/335 |
| 607,598 A | | 7/1898 | Closz | |
| 966,578 A | | 8/1910 | Murphy et al. | 209/401 |
| 3,552,563 A | * | 1/1971 | Smith | 209/534 |
| 3,928,183 A | * | 12/1975 | Asfour | 209/580 |
| 3,970,549 A | | 7/1976 | Ennis et al. | 209/341 |
| 4,108,546 A | * | 8/1978 | Rezanka | 399/356 |
| 4,216,836 A | | 8/1980 | Rayborn | 175/66 |
| 4,546,783 A | | 10/1985 | Lott | 134/109 |
| 4,575,421 A | | 3/1986 | Derrick et al. | 209/397 |
| 4,857,176 A | | 8/1989 | Derrick et al. | 209/397 |
| 5,076,921 A | | 12/1991 | Bailey et al. | 210/255 |
| 5,211,291 A | | 5/1993 | Kelley et al. | 209/680 |
| 5,221,008 A | | 6/1993 | Derrick, Jr. et al. | 309/269 |
| 5,330,057 A | * | 7/1994 | Schiller et al. | 209/392 |
| 5,417,793 A | | 5/1995 | Bakula | 156/308.2 |
| 5,417,858 A | | 5/1995 | Derrick et al. | 210/388 |
| 5,490,598 A | | 2/1996 | Adams | 209/401 |
| 5,614,094 A | | 3/1997 | Deister et al. | 210/388 |
| 5,783,077 A | | 7/1998 | Bakula | 210/388 |
| 5,851,393 A | | 12/1998 | Carr et al. | 210/489 |
| 5,876,552 A | | 3/1999 | Bakula | 156/308.2 |
| 5,904,843 A | * | 5/1999 | Herbst | 210/170 |
| 5,927,511 A | | 7/1999 | Riddle et al. | 209/405 |
| 6,152,307 A | | 11/2000 | Adams et al. | 209/403 |
| 6,209,726 B1 | | 4/2001 | Gallia | 209/397 |
| 6,220,448 B1 | | 4/2001 | Bakula et al. | 209/392 |
| 6,244,362 B1 | | 6/2001 | Williams | 175/206 |
| 6,283,302 B1 | | 9/2001 | Schulte et al. | 209/399 |
| 6,325,216 B1 | | 12/2001 | Seyffert et al. | 209/408 |

OTHER PUBLICATIONS

The Brandt Company, Composit Catalog, vol. 1, 1974, 2 pp.
Principles of High Speed Screening and Screen Machine Design, Derrick Mfg. Corp., 3 pp., prior to 1990.
Better Screening Technology, Fluid Systems Inc. 2000.

\* cited by examiner

*Primary Examiner*—Fred G. Prince
(74) *Attorney, Agent, or Firm*—Guy McClung

(57) ABSTRACT

A screen assembly for a vibratory separator having, in one aspect, a frame with a plurality of openings therethrough, screening material on the frame over the openings, the frame having an end area at a material exit end of the frame, and end apparatus at the end area for facilitating material movement over the end area; in one aspect, non-smooth areas on top of the screen assembly to impede solids movement on such areas and/or to direct them off such areas; vibratory separators with such a screen assembly; and methods of their use.

24 Claims, 17 Drawing Sheets

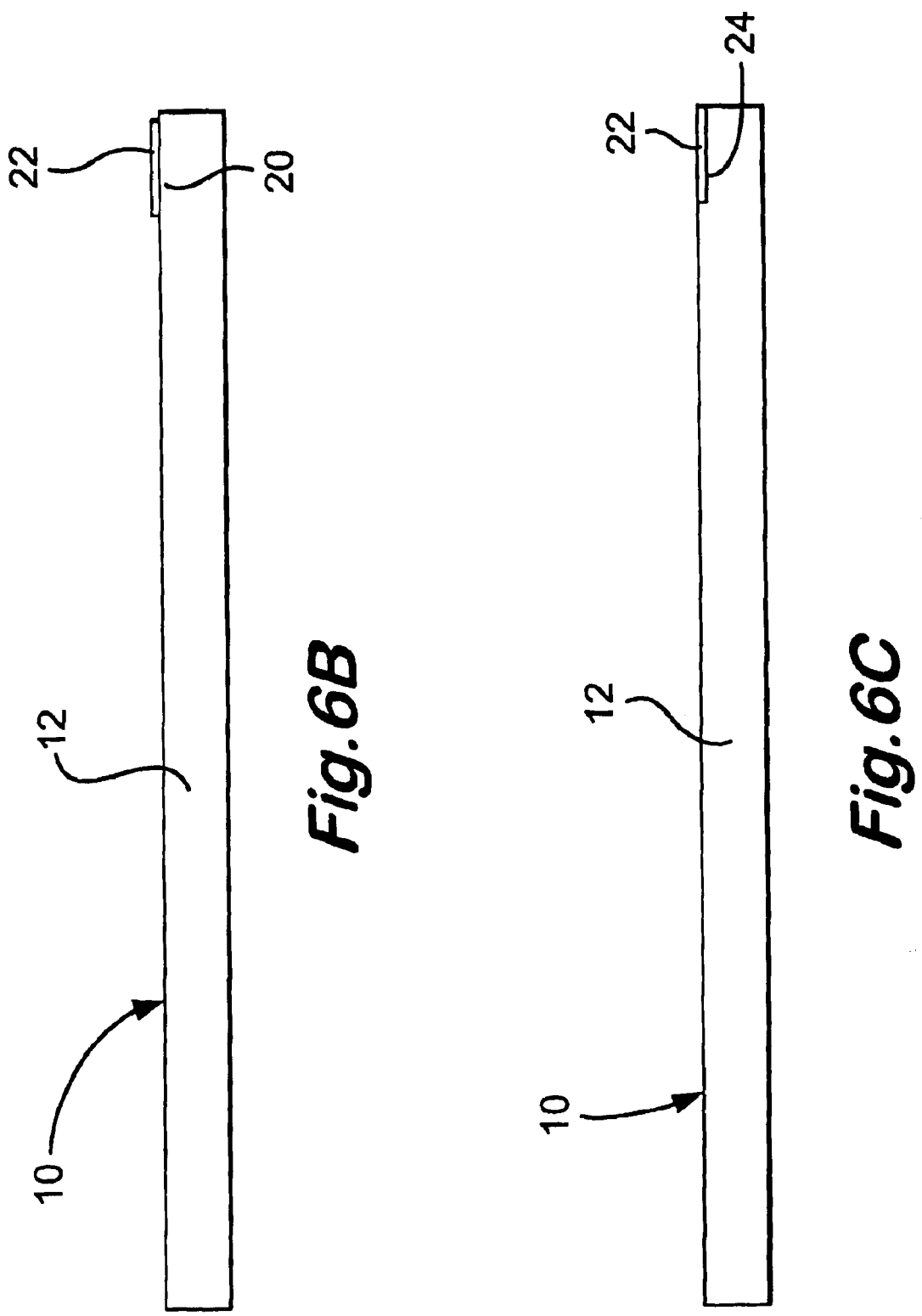

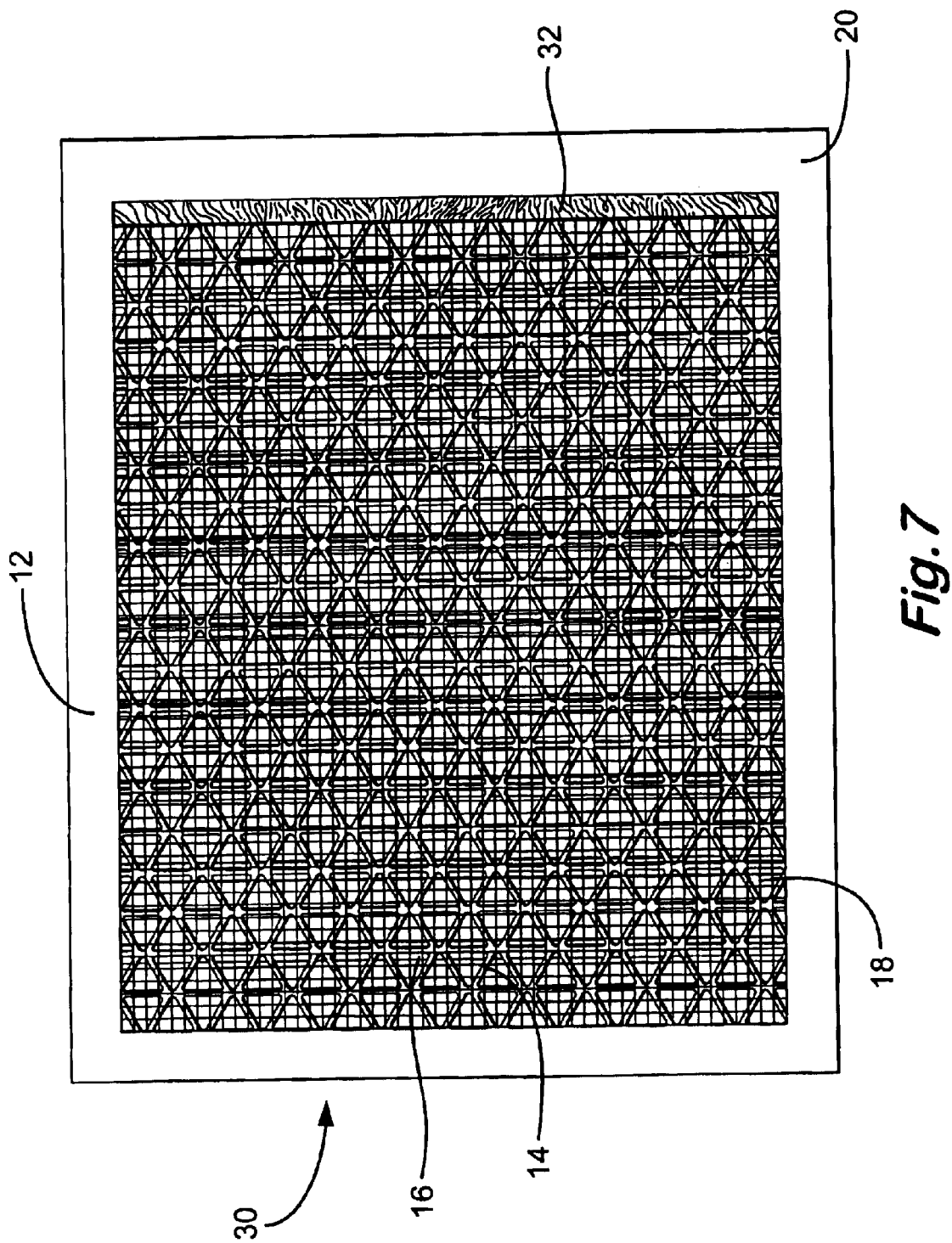

SEPARATOR SCREEN WITH SOLIDS CONVEYING END AREA

BACKGROUND OF THE INVENTION

1. Field of the Invention

The present invention is directed to: screens for vibratory separators and shale shakers; vibratory screening methods; and separators and shale shakers used in such methods; and, in certain particular aspects, to methods for separating different size particles from the top of a screen assembly on a vibratory separator device.

2. Description of Related Art

Vibratory separators are used in a wide variety of industries to separate materials such as liquids from solids or solids from solids. Typically such separators have a basket or other screen holding or mounting apparatus mounted in or over a receiving receptacle or tank and vibrating apparatus for vibrating the basket. One or more screens is mounted in the basket. Material to be treated is introduced to the screen(s) and separated material on top of the screen(s) flows off an end of an end screen. In many screens used with vibratory separators, there are a plurality of spaced-apart supports that support screening material on the screen.

With certain prior art screen assemblies used in vibratory separators and shale shakers, screening material is mounted on a frame or support and the screening material extends over substantially all of the frame's or support's area; but there is an end area that is solid and is a boundary for the screening material. Separated material on the top of the screen that is to exit from the end of the screen moves off of the screening material, over this solid end area, and then off of the screen assembly. In many prior art screen assemblies this end area is relatively smooth compared to the relatively contoured or non-smooth surface presented to fluid by the screening material.

Separated material, e.g., but not limited to, drilling solids, can accumulate at the very end of the screening material and tend to bunch up and agglomerate rather than move off the screen end over the solid end area. Whereas the screening surface of the screening material provides non-smooth areas on which a solid particle can gain a foothold and move forward and non-smooth areas that can launch a solid particle forward, the smooth end area presents only a smooth solid surface that accomplishes no facilitation of particle movement. Particularly when a screen is inclined so that separated material is moving "uphill," this phenomenon of solids accumulation can occur.

As shown in FIGS. 1A and 1B, it is also a known phenomenon in the prior art for separated solids to move down a screen and to tend to move above open screening areas and to tend to move away from areas of screening material beneath which are located support ribs, bars, members, strips, beams, etc. FIG. 1A shows relatively large solids LS moving down and off a screen SC above open screening areas OA. Relatively smaller solids SS move down and off the screen above supports (not shown) under the screen SC. Of course, some solids LS can and do move in the areas in which the smaller solids SS move and vice versa.

To illustrate this phenomenon, a screen SR in FIG. 1B is shown with its screening material removed so that a plurality of support ribs RB are exposed. Larger solids SL tend to move on screening material in areas beneath which no rib is present; and relatively smaller solids SD tend to move in the areas beneath which the ribs RB are located.

In the prior art no effort has been made to take advantage of this particle separation by size that occurs on top of vibratory separator screens. Rather, the combined flow of particles of all sizes flows off the end of a screen and into a single tank, receptacle, or collection container or onto the ground.

FIGS. 2A–2E show a prior art screen assembly 1 with a frame 2, cross supports 3, and screening mesh 4. A plurality of openings 5 extend through the frame 12. Typically the screening mesh 4 is one, two, three or more layers of screening material. The top surfaces of the frame parts are typically smooth.

There has long been a need, recognized by the present inventors, to overcome the deleterious effects of material accumulation and agglomeration at the non-smooth end area of a screen assembly. There has long been a need, recognized by the present inventors, for an efficient and effective method to utilize the particle separation that occurs on the top of screens with lower support members on vibratory separators.

SUMMARY OF THE PRESENT INVENTION

The present invention discloses, in certain aspects, a screen assembly for a vibratory separator or shale shaker with a frame or other screen support with a plurality of openings therethrough, the frame having a material exit end, screening material on the frame over the openings, the frame having an end area at the material exit end of the frame, and end structure or apparatus at the end area for facilitating material movement over the end area and off the screen assembly.

The present invention discloses, in certain aspects, a screen assembly with a frame or other screen support with a plurality of openings therethrough, the frame having a material exit end, screening material on the frame over the openings, wherein set or hardened adhesive material, epoxy or glue connects the screening material to the frame, the screening material having a top surface, portions of the adhesive material at the top surface of the screening material, material or solids movable on the portions of the adhesive material, the portions of the adhesive material having portion apparatus or structure for impeding the movement of solids on the portions and/or for directing material or solids off of the portions.

The present invention discloses, in at least certain aspects, screen assemblies with structure at an end area that is non-smooth and which facilitates movement of separated material, including, but not limited to, drilling solids and/or drilled cuttings, over and off of the end area of the screen assembly, e.g., by providing a "foothold" for the solids or material rather than a smooth area. In one aspect, the structure includes a roughened end area that is made, for example, by using a file or other tool, or a buffer, grinder or sander on the previously-smooth end area to provide a non-smooth area. With such a tool, etc. gouges, recesses, pits, and/or indentations to any desired depth, and in one particular aspect up to $\frac{1}{16}$ inch deep, may be provided in the end area. Such gouges, etc. may be in a pattern across the end area or they may be random in size, width, extent and depth. In other aspects, non-smooth areas are provided on areas of the screen (in addition to end areas) to impede material or solids flow over these areas and/or to direct material or solids off of these areas.

In other aspects, a piece of non-smooth material, including, but not limited to screening material of coarse, fine or medium mesh; Kevlar (trademark) material; synthetic fabric; natural fabric, including, but not limited to, burlap, canvas, and denim; woven or air laid web material; and/or releasably cooperating fastener material [e.g., but not limited to hook material, loop material, and Velcro (trademark) material], is used to provide a non-smooth top surface that facilitates material movement over the end area, e.g., by providing a "foothold" for solids rather than a smooth surface; or on other areas of the screening material to impede material or solids flow over these areas and/or to direct material or solids off of these areas. The mesh, etc. may be secured to the screen end area (or to other screen areas, e.g., that have an amount of set or hardened material that can act as a non-screening pathway for material or solids and which can deleteriously affect screen performance) with any suitable adhesive, glue, epoxy, screws, plugs, rivets, bolts, and/or other fastener devices or substances.

In certain embodiments, the width of the non-smooth area is substantially similar to that of the screening material. In other aspects, the width of the non-smooth area is wider than that of the screening material. In yet other aspects the width of the non-smooth area increases from the end of the screening material to a point distal therefrom on the solid end.

In certain embodiments, the present invention discloses, in at least certain aspects, a shale shaker (or vibratory separator) with an apparatus which has upright walls or separation members which channel the flow of relatively small particles flowing along a path above support members on top of a screen on the vibratory separator. The relatively small particles flow between the walls and then into a common receptacle. The relatively larger particles that flow on screening areas that are not above supports for the screen flow off the end of the screen and do not flow into the common receptacle into which the relatively smaller particles flow. Alternatively no common receptacle is used and each flow line or flow path has its own collector.

It is, therefore, an object of at least certain preferred embodiments of the present invention to provide:

New, useful, unique, efficient, non-obvious screen assemblies and frames for them for vibratory separators and shale shakers which screen assemblies have a non-smooth end area to facilitate the exit of materials from the top of the screen;

New, useful, unique, efficient, non-obvious screen assemblies and frames for them for vibratory separators and shale shakers which screen assemblies have non-screening pathways thereon and structure on the non-screening pathways to impede the flow of material and/or solids on such pathways and/or to direct material and/or solids off such pathways;

Such screen assemblies in which the non-smooth area is provided by altering the solid end area of a screen assembly, e.g., by grinding etc.;

Such screen assemblies in which the non-smooth area is provided by adding structure to the solid end area of a screen that assists in moving material from the top of the screen and off the screen;

New, useful, unique, efficient, non-obvious screen assemblies and frames for them for vibratory separators and shale shakers with non-smooth areas on top of a screen to impede the movement of solids over such areas.

New, useful, unique, efficient, non-obvious screening methods for vibratory separators and shale shakers and methods for using them that employ such screen assemblies;

New, useful, unique, efficient, non-obvious screening methods for vibratory separators and shale shakers and methods for using them to separate components of material to be treated thereby by size;

New, useful, unique, efficient, non-obvious screening methods for vibratory separators and shale shakers and methods for using them to separate components of material to be treated thereby by size;

Such methods that employ new, useful, unique, efficient, non-obvious apparatuses to remove particles from a shaker or separator and separate them by size; which, in certain particular aspects are area isolating particle reception apparatuses, scoop apparatuses and/or end trough apparatuses; and.

New, useful, unique, efficient, non-obvious shakers and vibratory separators that use such apparatuses.

The present invention recognizes and addresses the previously-mentioned problems and long-felt needs and provides a solution to those problems and a satisfactory meeting of those needs in its various possible embodiments and equivalents thereof. To one of skill in this art who has the benefits of this invention's realizations, teachings, disclosures, and suggestions, other purposes and advantages will be appreciated from the following description of preferred embodiments, given for the purpose of disclosure, when taken in conjunction with the accompanying drawings. The detail in these descriptions is not intended to thwart this patent's object to claim this invention no matter how others may later disguise it by variations in form or additions of further improvements.

DESCRIPTION OF THE DRAWINGS

A more particular description of embodiments of the invention briefly summarized above may be had by references to the embodiments which are shown in the drawings which form a part of this specification. These drawings illustrate certain preferred embodiments and are not to be used to improperly limit the scope of the invention which may have other equally effective or equivalent embodiments.

FIGS. 6A–11 are top views of screen assemblies according to the present invention.

14B is a perspective view of a screen assembly according to the present invention.

DESCRIPTION OF EMBODIMENTS PREFERRED AT THE TIME OF FILING FOR THIS PATENT

Figure 6A:
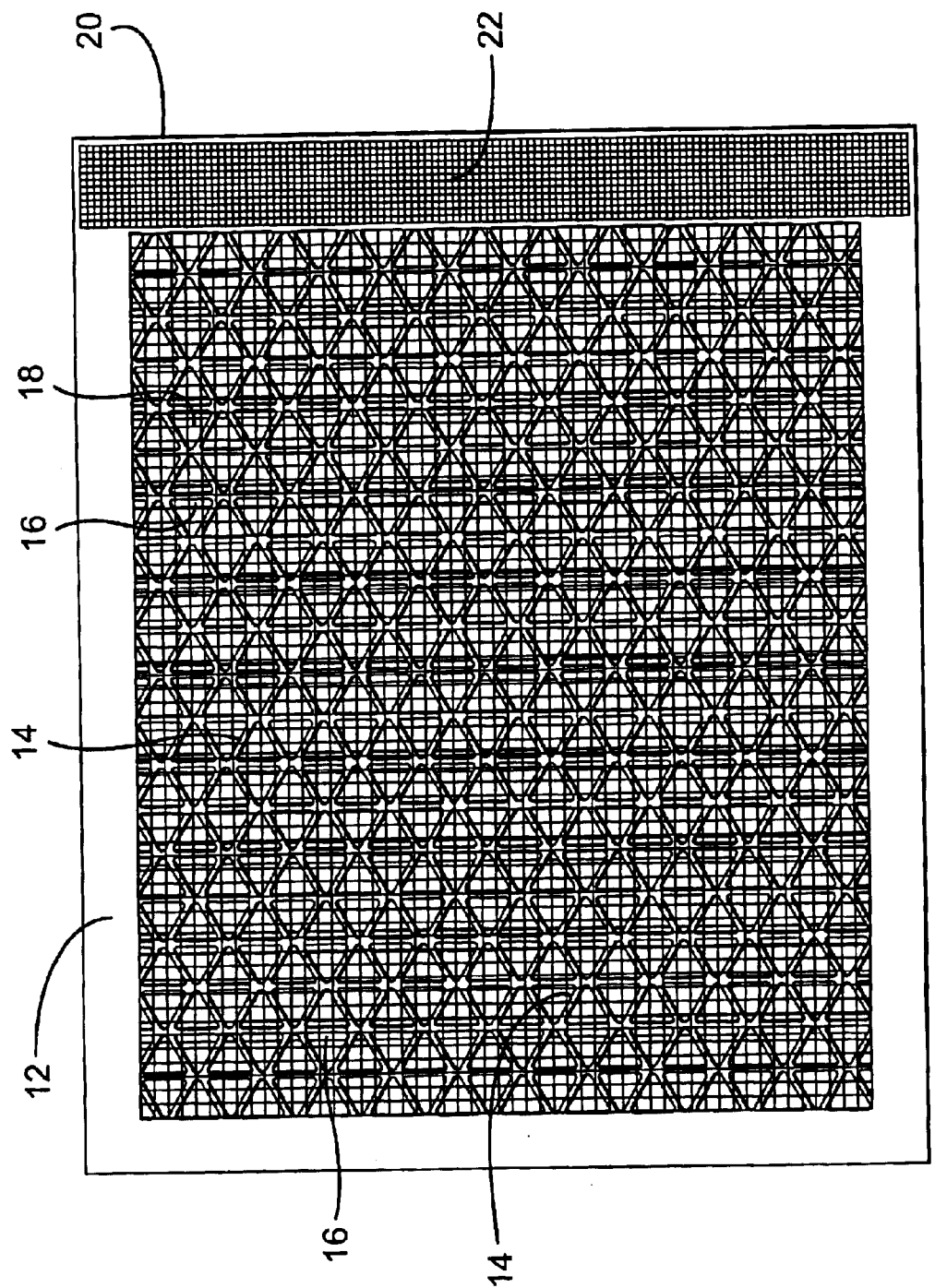

FIGS. 6A and 6B show a screen assembly 10 according to the present invention which has a frame 12 with a plurality of holes 14 therethrough and a series of lower supporting members 16. Screen mesh 18 is secured to the frame 12. It is to be understood that it is within the scope of this invention for the frame 12 (and any frame in FIGS. 6A–11) to be any known frame or plate with a plurality of openings over or under which is one or more layers of screening material or mesh secured to the frame or plate in any known manner.

The frame 12 has an end area 20 over and past which material on top of the screen assembly 10 moves to exit from the screen assembly 10. Secured over a substantial portion of the end area 20 is a layer of screening material 22. Separated material, e.g., but not limited to drilled cuttings and/or drilling solids, are moved by vibration to the end area 20 and then move onto the layer of screening material 22 which facilitates their movement off of the screen assembly 10.

It is within the scope of the present invention to place a screening material layer 22 on the top surface of the end area 20 or, as in FIG. 5C, to make a recess 24 in which the screening layer 22 is emplaced and secured.

Figure 6D:
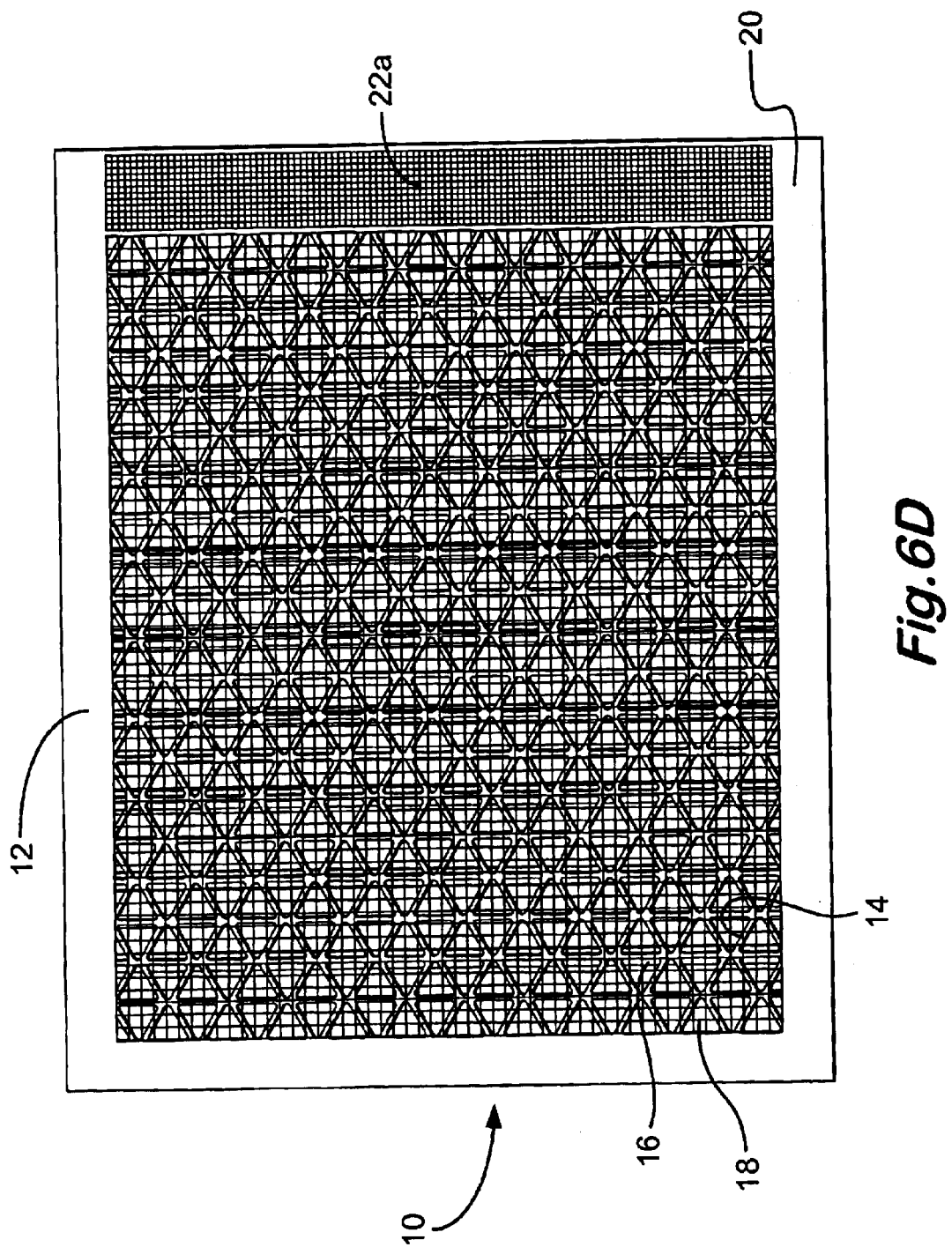
Figure 6E:
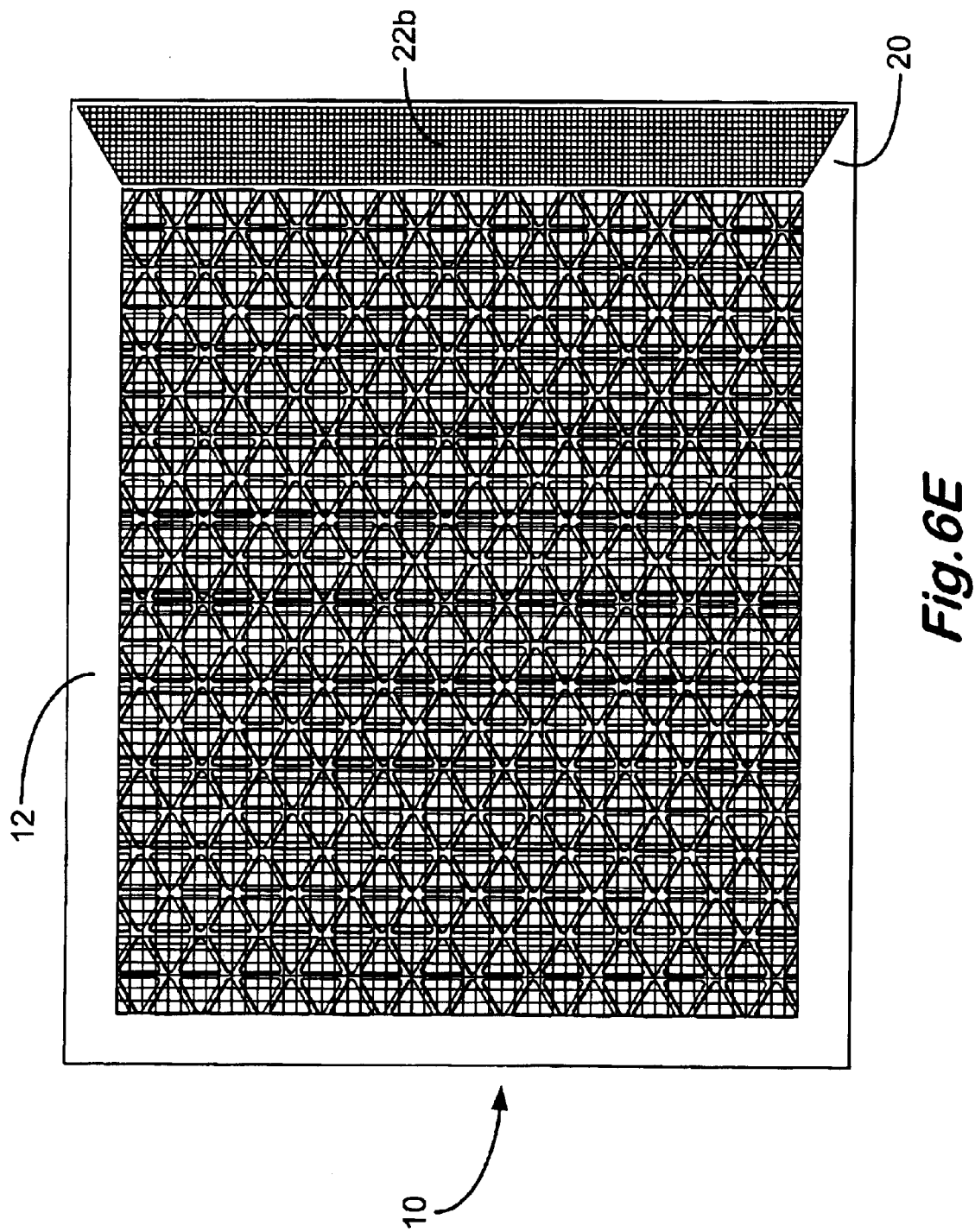

As shown in FIG. 6A the layer of screening material 22 extends across the width of the frame 12. It is within the scope of the present invention to have the screening layer of any desired length, as viewed from above. As shown in FIG. 6D a screening material layer 22a (like the screening material layer 22) is about the same length as the width of the frame area with openings therethrough. As shown in FIG. 6E a screening material layer 22b has a length adjacent the screening mesh 18 and the length increases as the screening layer 22b extends to the end of the frame 12.

It is within the scope of this invention for the screen mesh 18 and/or the screening material layer in FIGS. 6A–6E to be one, two, three or more layers and to be of any mesh size or openings, including, but not limited to any known fine, medium and/or coarse mesh or screen used on any known screen or screen assembly for vibratory separators or shale shakers.

FIG. 7 shows a screen assembly 30 like the screen assembly 10, and like numerals indicate like parts. Instead of a screening material layer 22, the screen assembly 30 has a strip of fabric 32 over part of the end area 20. It is within the scope of this invention for the fabric 32 (and also for any layer of screening material or other end area cover or treatment) to have a width substantially equal to that of the end area 20 or to be any desired width. Any fabric, synthetic or natural, may be used for the fabric 32, including, but not limited to, burlap, canvas and Kevlar™ material.

Figure 8:
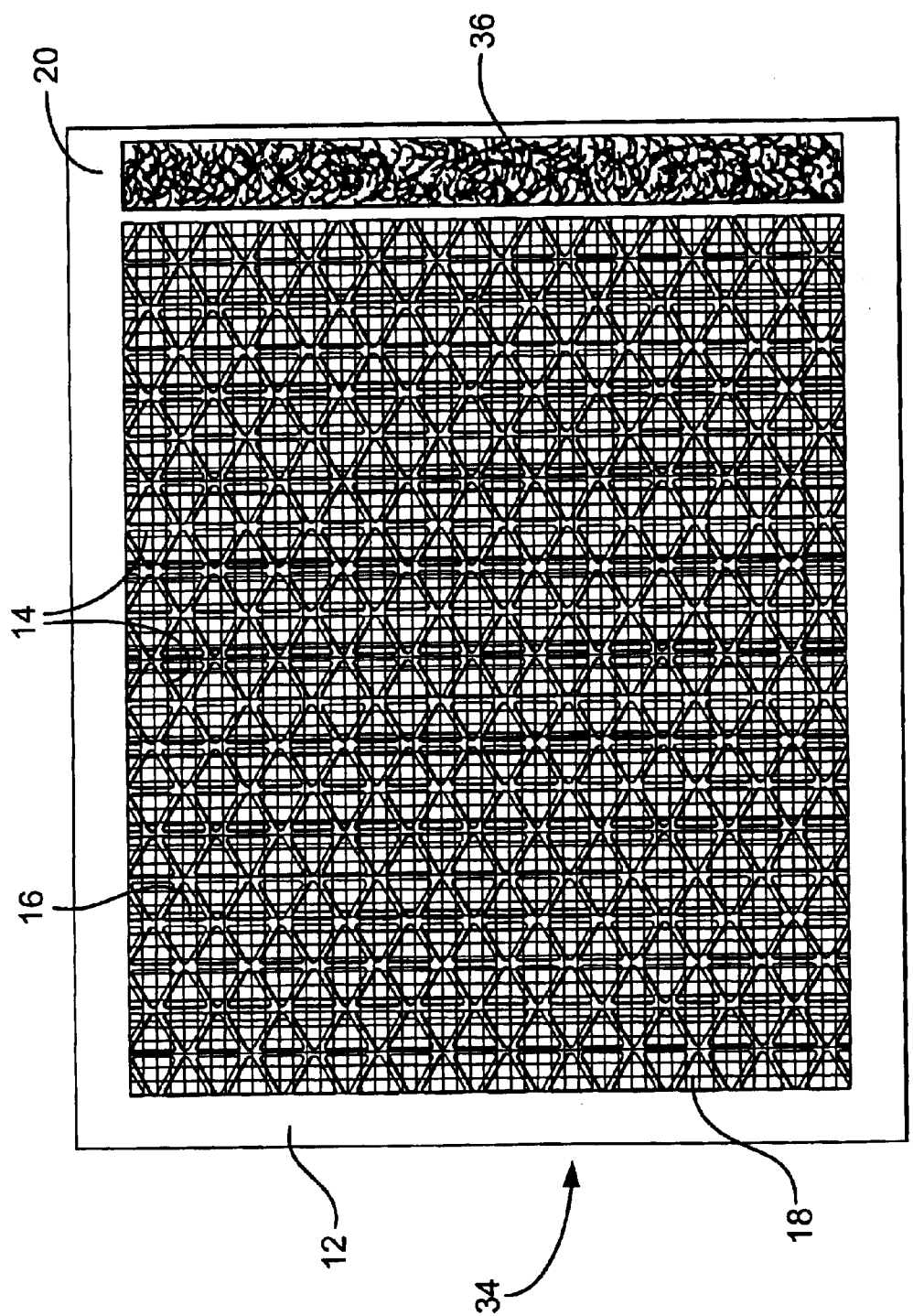

FIG. 8 shows a screen assembly 34 (like the screen assembly 10 and like numerals indicate like parts) with releasably co-operating fastener material 36 secured to a portion of the end area 20.

Figure 9:
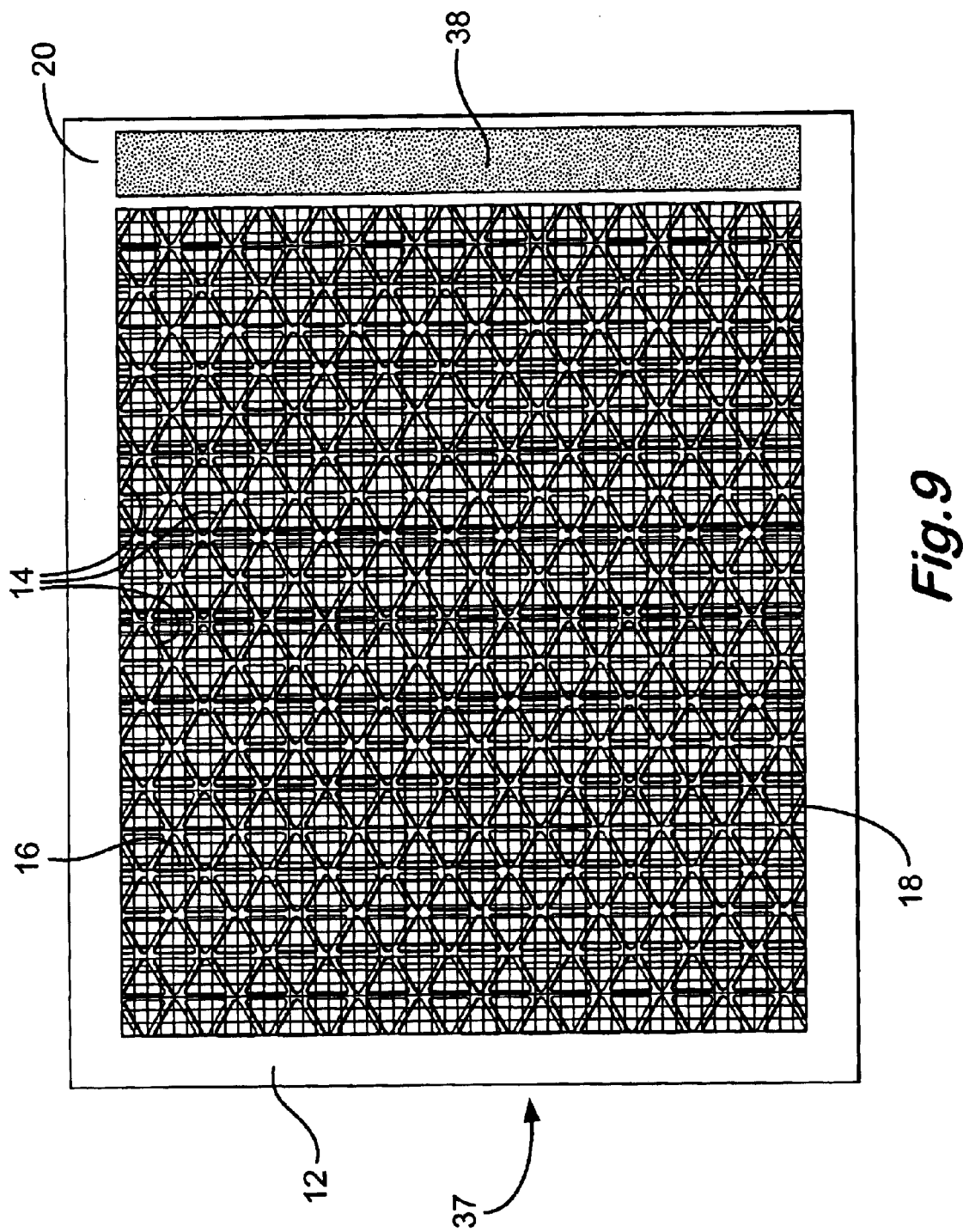

FIG. 9 shows a screen assembly 37 (like the screen assembly 10 and like numerals indicate like parts) with a portion 38 of the end area 20 sanded or buffed to present a sanded or roughened surface to material flowing from the top of the screen assembly into the end area 20.

Figure 10:
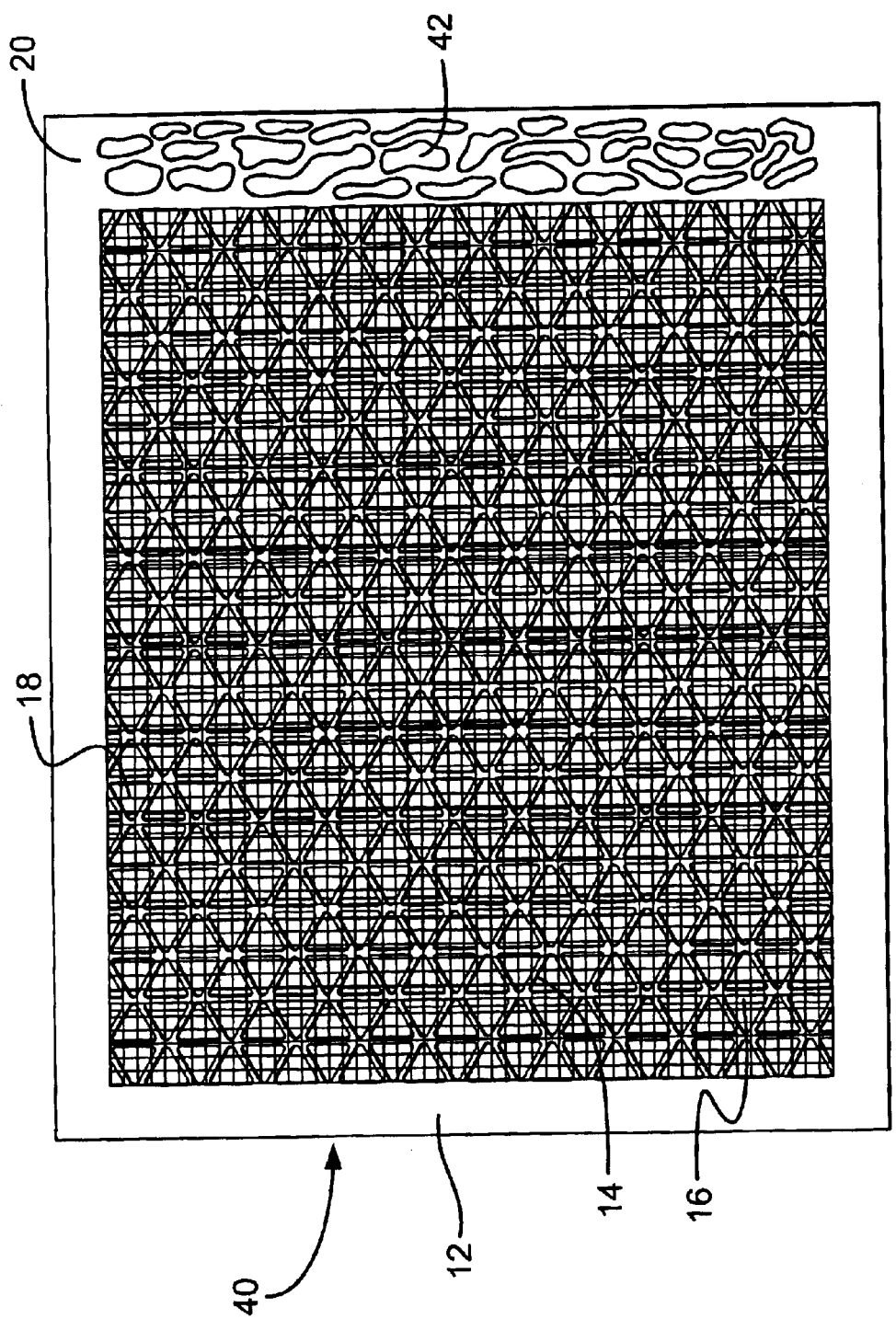

FIG. 10 shows a screen assembly 40 (like the screen assembly 10 and like numerals indicate like parts) with gouges, indentations, or roughened parts 42 made, e.g., with a suitable hand tool or with a grinder.

Figure 11:
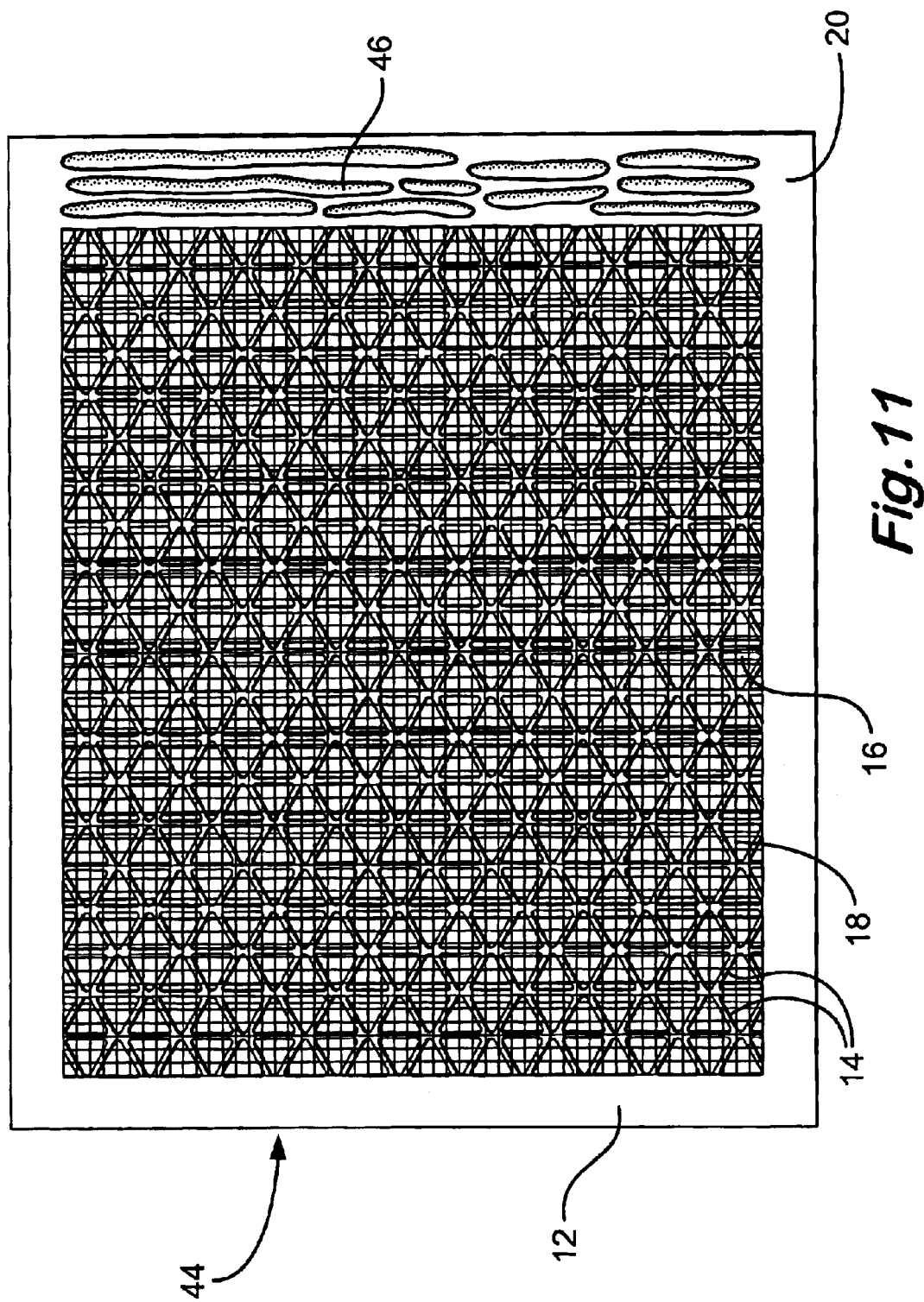

FIG. 11 shows a screen assembly 44 (like the screen assembly 10 and like numerals indicate like parts) with an amount 46 of set and/or hardened glue, epoxy, silicone or adhesive over the end area 20.

Figure 12:
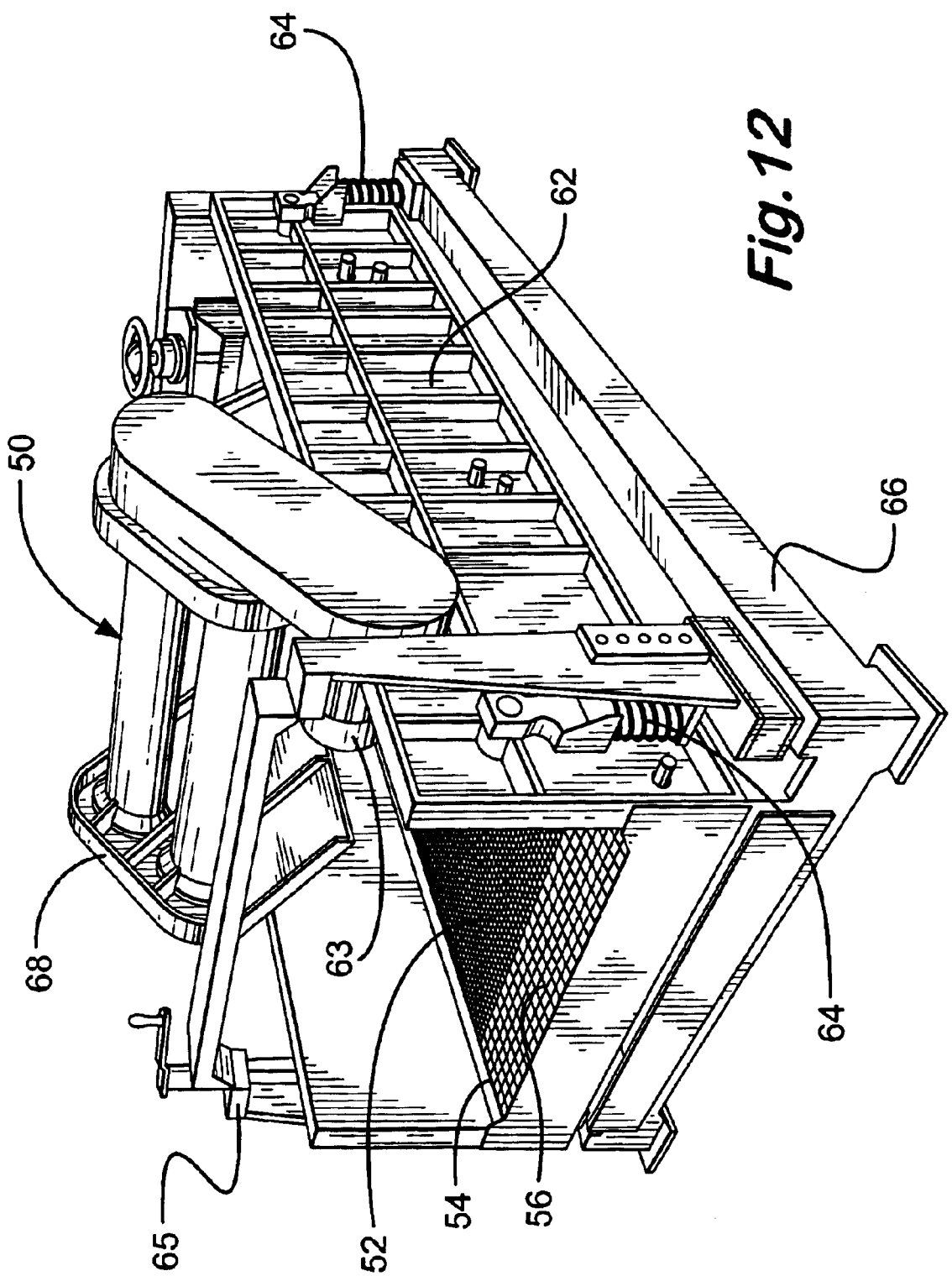
FIG. 12 is a perspective view of a vibratory separator according to the present invention.

FIG. 12 shows a shale shaker 50 according to the present invention with a screen assembly 52 according to the present invention which has a frame with an end area 54 with a layer 56 of screening material on top of the end area 54 for facilitating the exit of material off the top of the screen assembly 52. It is within the scope of the present invention to use one, two, three or more of the screen assemblies 50 and to use any screen assembly according to the present invention with any other known vibratory separator or shale shaker. The screen assembly 50 is mounted on vibratable screen mounting apparatus or "basket" 62. The basket 62 is mounted on springs 64 (only two shown; two as shown are on the opposite side) which are supported from a base 66. The basket 62 is vibrated by a motor 63 and interconnected vibrating apparatus 68 which is mounted on the basket 62 for vibrating the basket and the screens. Elevator apparatus 65 provides for raising and lowering of the basket end. As shown the screen assembly 52 is like the screen assembly of FIG. 6A, but may be any screen assembly according to the present invention, including, but not limited to, any screen assembly and/or device as disclosed in FIGS. 3A–5B and/or in FIGS. 3A–5B.

Figure 13A:
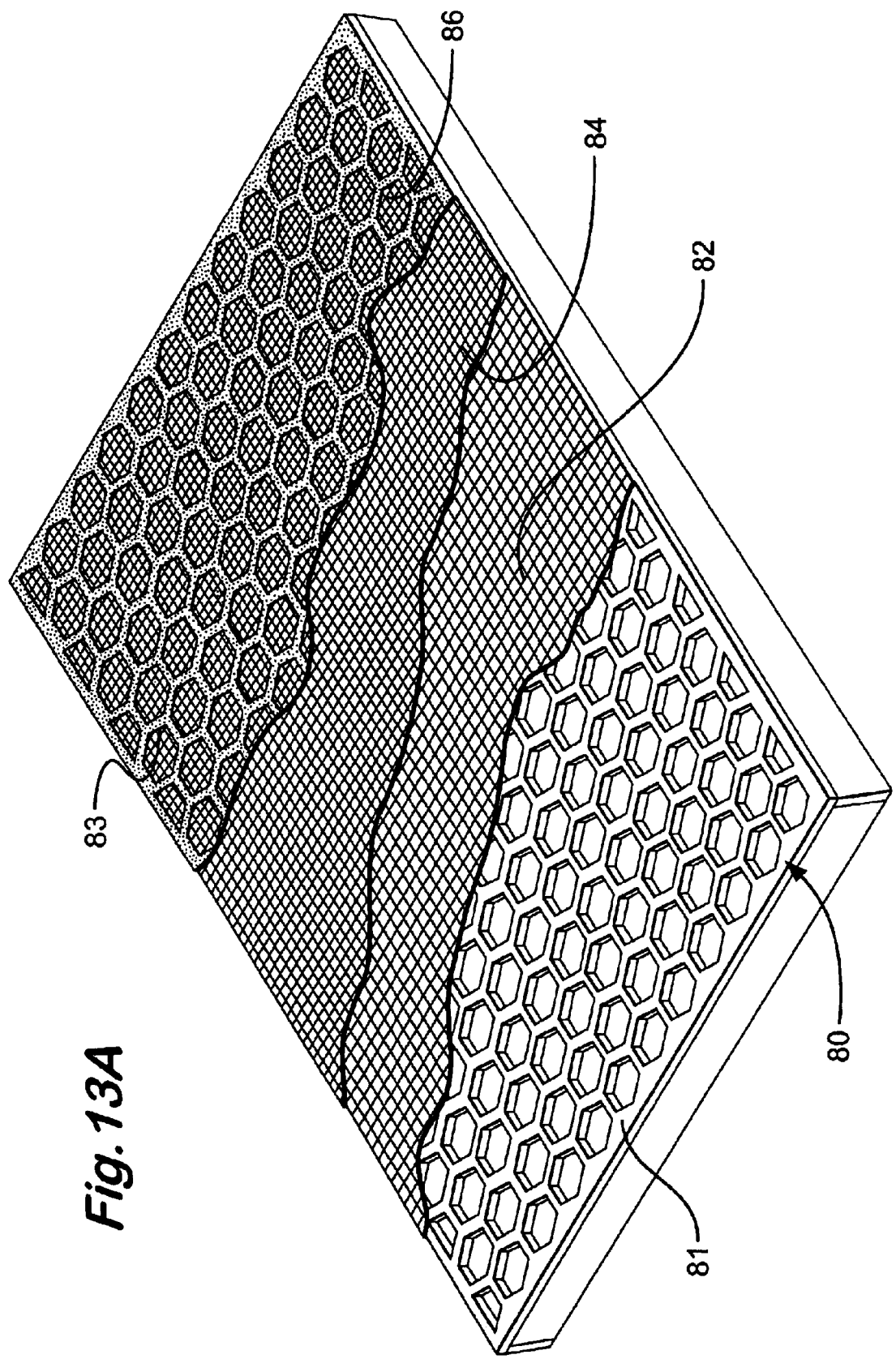
FIG. 13A is a perspective view, partially cut away, of a screen assembly according to the present invention.
Figure 13B:
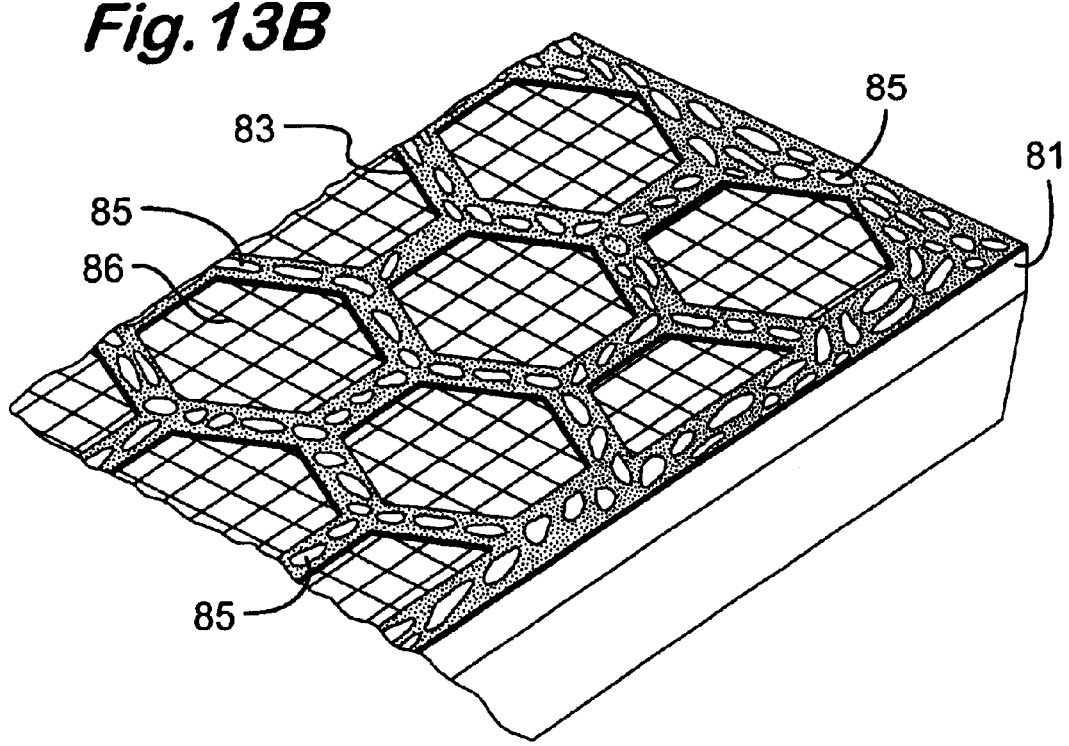
FIG. 13B is an enlarged view of a portion of the screen assembly of FIG. 13A.

FIG. 13A shows a screen assembly 80 according to the present invention which has a lower frame 81 and multiple layers of screening mesh 82, 84, 86 which in one aspect, are progressively finer from the lower-most to the top-most layer. Epoxy material connects the mesh layers to the frame and portions 83 of the epoxy material are at (or slightly above) the same level as the top of the top-most screening mesh layer 86. Alternatively glue, including hot melt glue, may be used.

In certain prior art screen assemblies, a pattern of epoxy material can provide a non-screening pathway for material and/or solids to move across a screen assembly. Such material is not screened when it is on such a pathway. To impede the flow of such material and/or solids and/or to direct them off such pathways, the portions 83 of the epoxy material have one or a series (in a pattern or randomly located) of raised areas 85 in the epoxy material portions 83. Alternatively, or in addition to such raised areas, the portions 83 may have one or more indentations (like any indentation, recess, pit, or gouged area disclosed herein). Such raised area(s) and/or indentation(s) may, according to the present invention, be provided on any adhesive, epoxy or glue material at or slightly above the top of a topmost screening layer of any known screen assembly for use in a vibratory separator or shale shaker. The frame 81 may be any known support for a screen assembly, including, but not limited to, perforated plates, tubular frames, and strip supports. Alternatively, as described above, fabric, synthetic or natural, or screen material may be used for the raised areas 85.

Figure 14A:
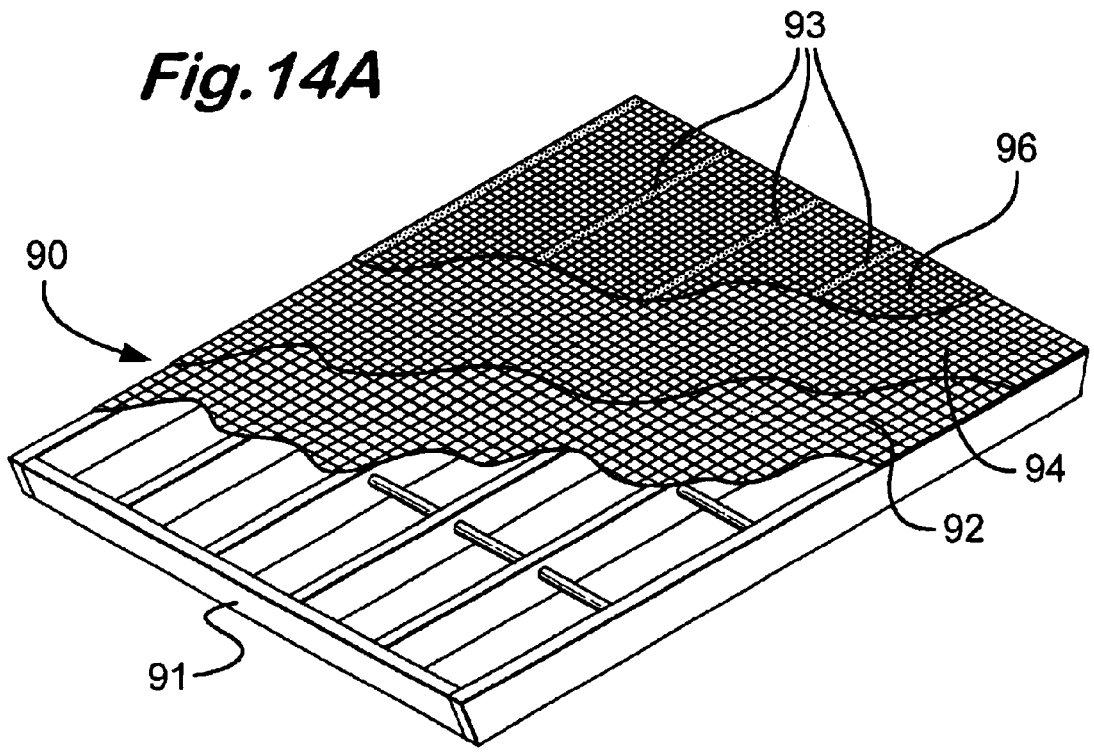
FIG. 14A is a perspective view, partially cut away, of a screen assembly according to the present invention. FIG.
Figure 14B:
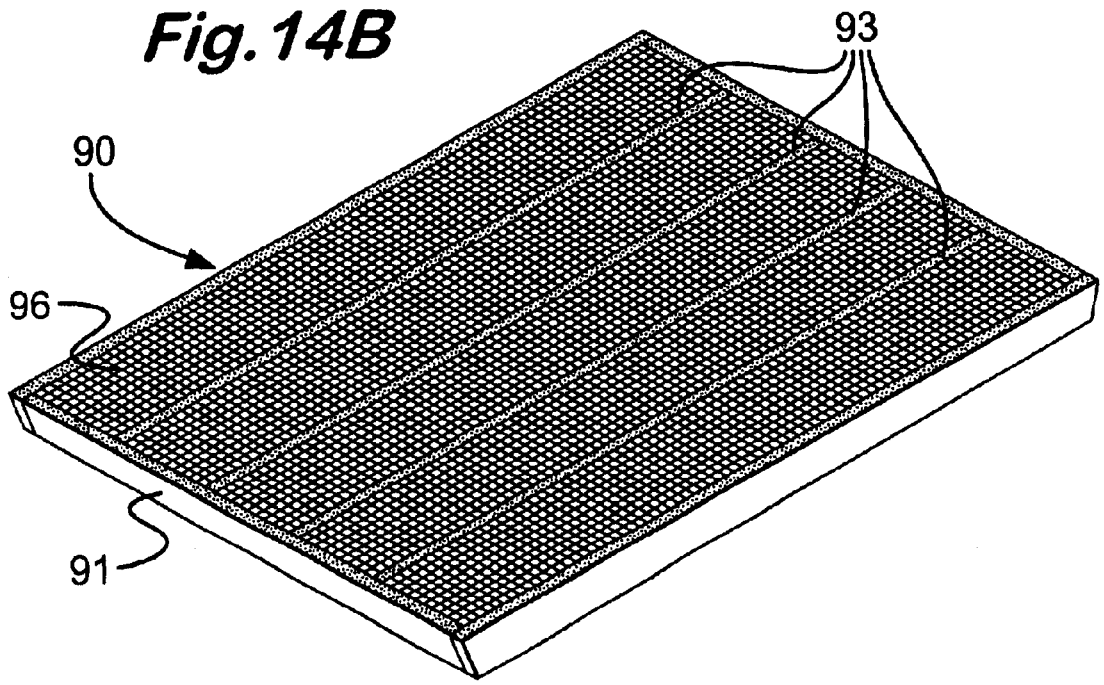
FIG. 14C is an enlarged view of a portion of the screen assembly of FIG. 14A.
Figure 14C:
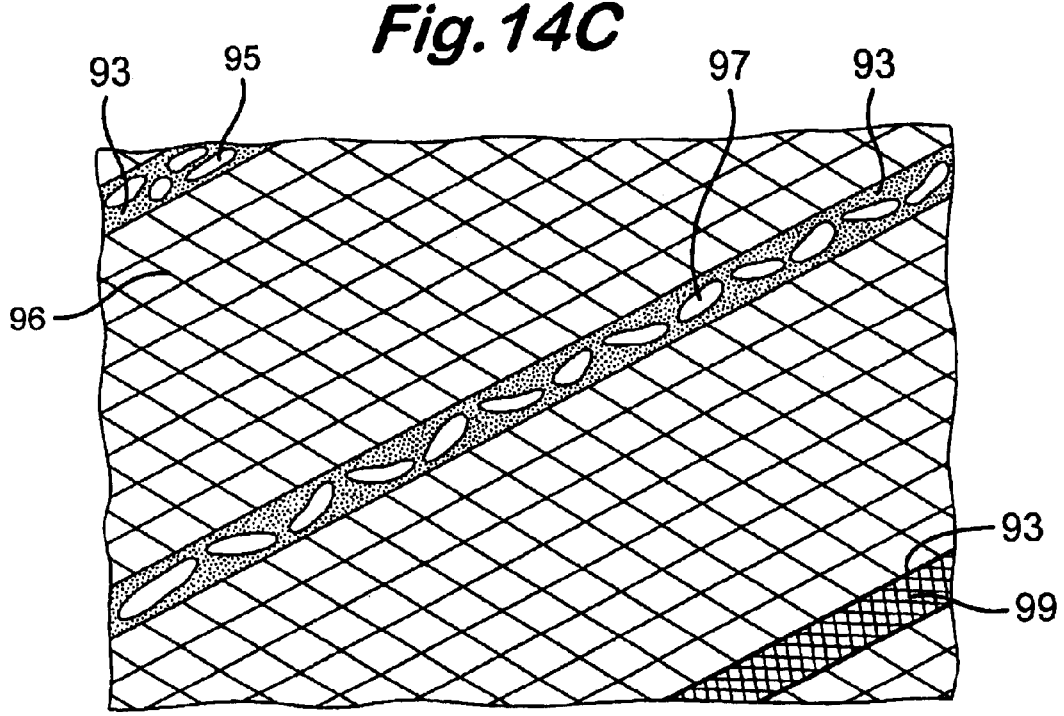

FIGS. 14A and 14B show a screen assembly 90 according to the present invention which has a frame 91 (like the frame 81) with multiple screen mesh layers 92, 94, 96 (like the layers 82, 84, 86, FIG. 13A). Epoxy material connects the mesh layers to the frame 91 and portions 93 of the epoxy material are at or slightly above a top of the top-most layer 96. To impede material flow along the portions 93 of epoxy material and/or to direct material off such portions 93, as shown in FIG. 14C, one or a series of indentations 95 (like any indentation, recess, pit, or gouged area disclosed herein) may be used on all or parts of the portions 93; a series of raised areas 97 may be used on all or part of the portions 93; and/or screen mesh 99 (and/or fabric) may be used on all or part of the portions 93.

Figure 1A:
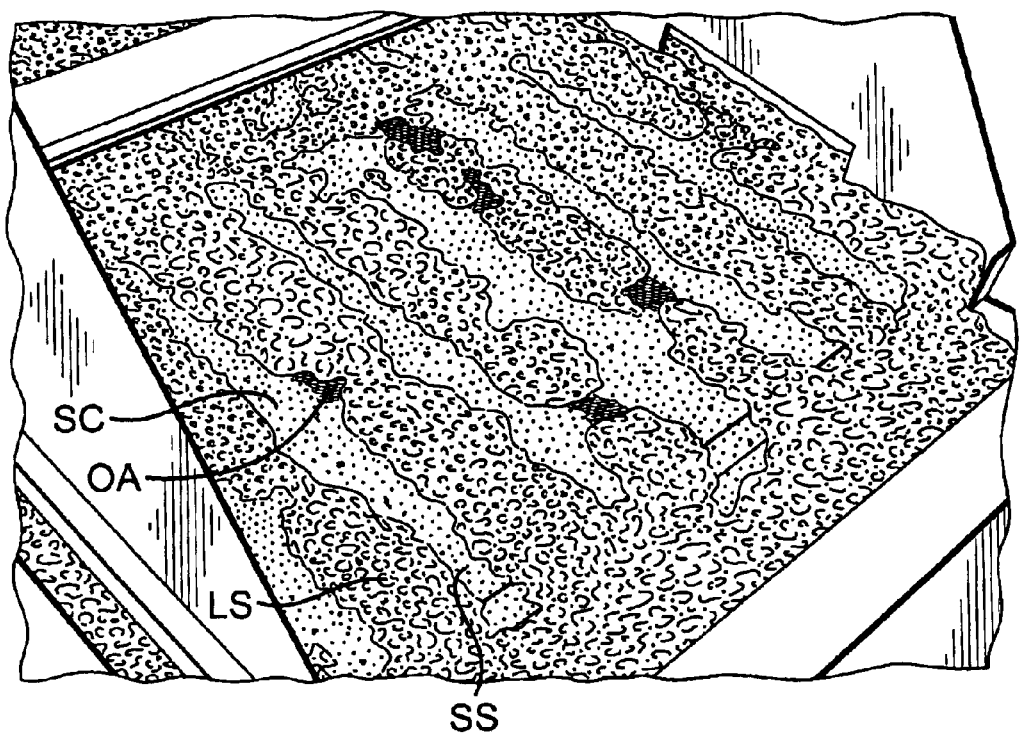
FIG. 1A is a perspective view of a prior art vibratory separator.
Figure 1B:
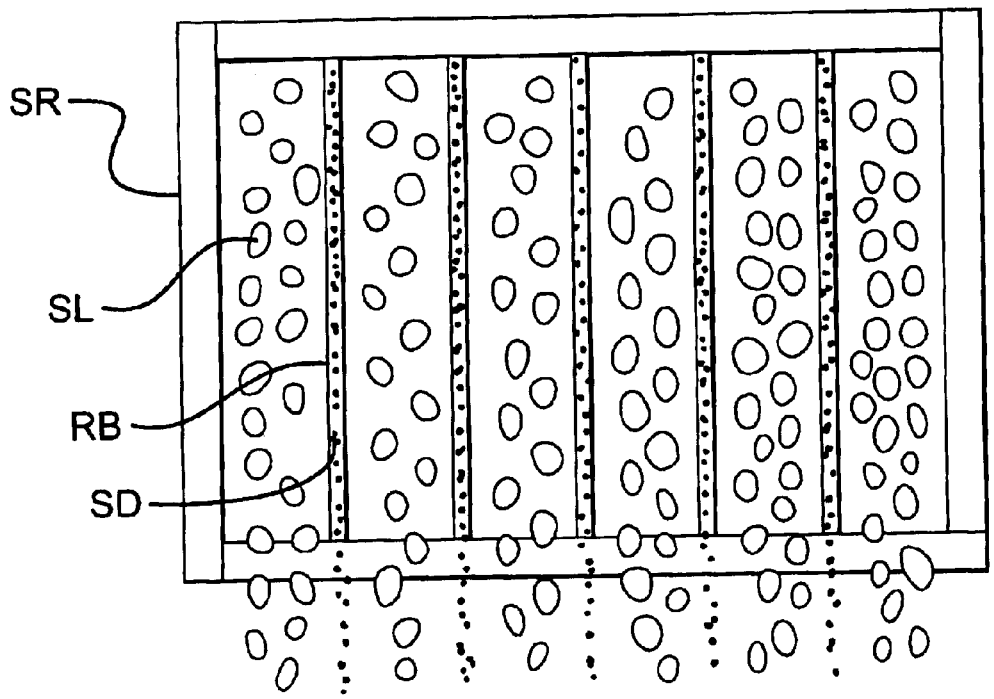
FIG. 1B is a top view of a prior art vibratory separator apparatus.
Figure 2A:
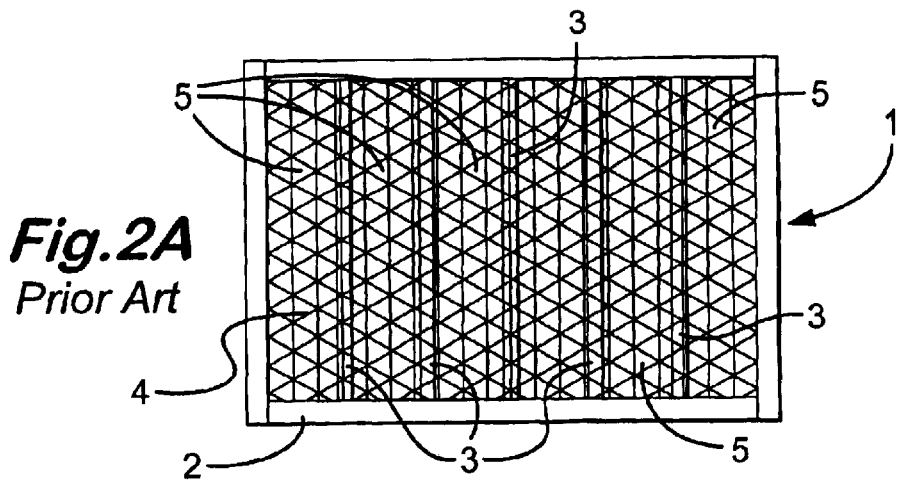
FIG. 2A is a to view of a prior art screen assembly.
Figure 2B:
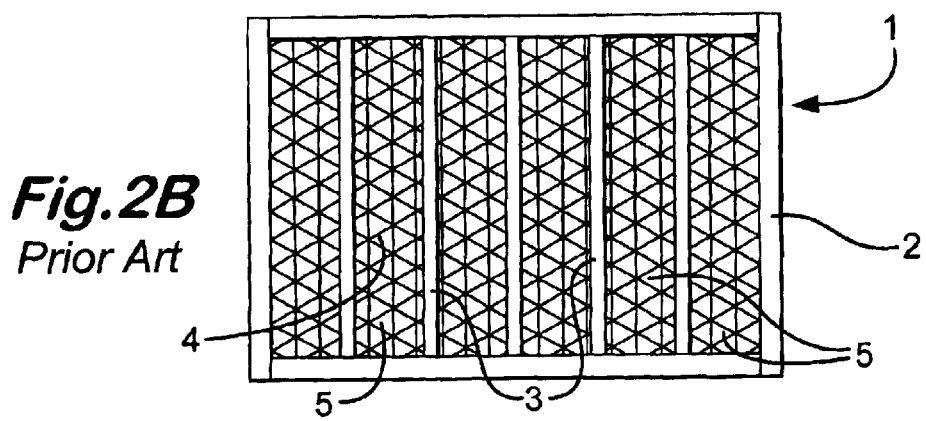
FIG. 2B is a bottom view and FIG. 2D is a side view of the screen assembly of FIG. 2A.
Figure 2C:
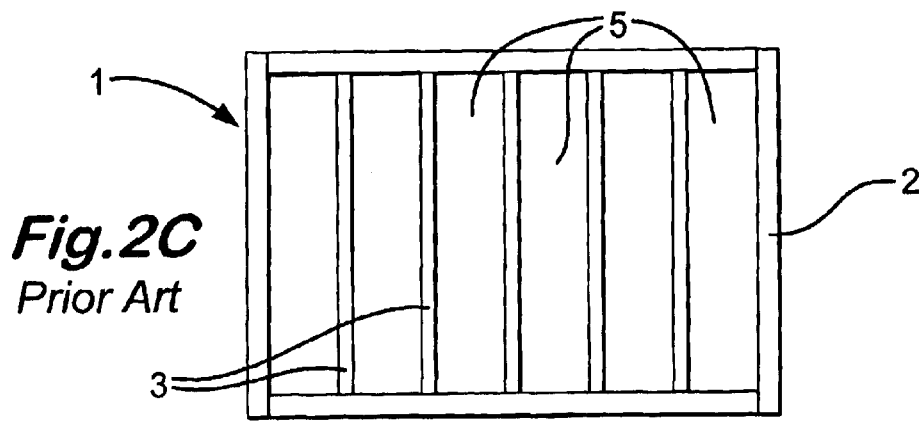
FIG. 2C is a bottom view of part of the screen assembly of FIG. 2A.
Figure 2D:
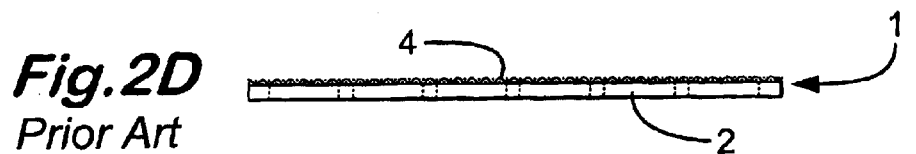
Figure 2E:
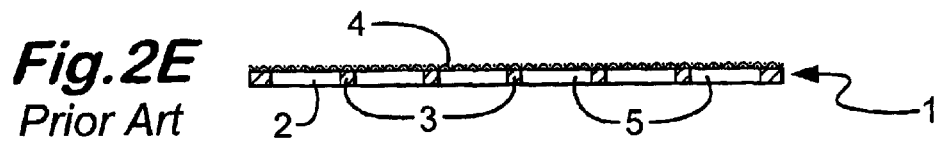
FIG. 2E is a cross-section view of the part of FIG. 2C.
Figure 3A:
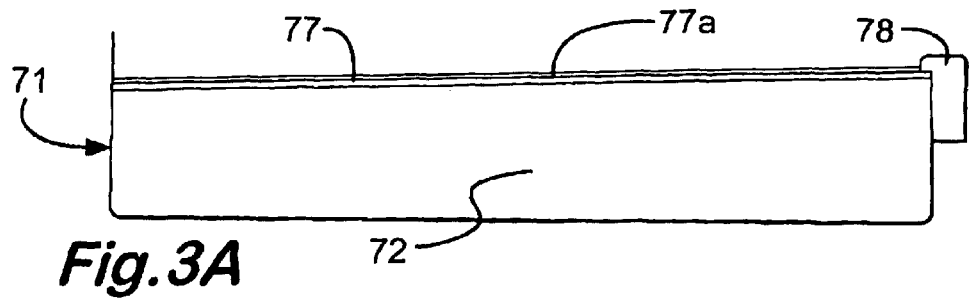
FIG. 3A is a side view of a shaker according to the present invention.
Figure 3B:
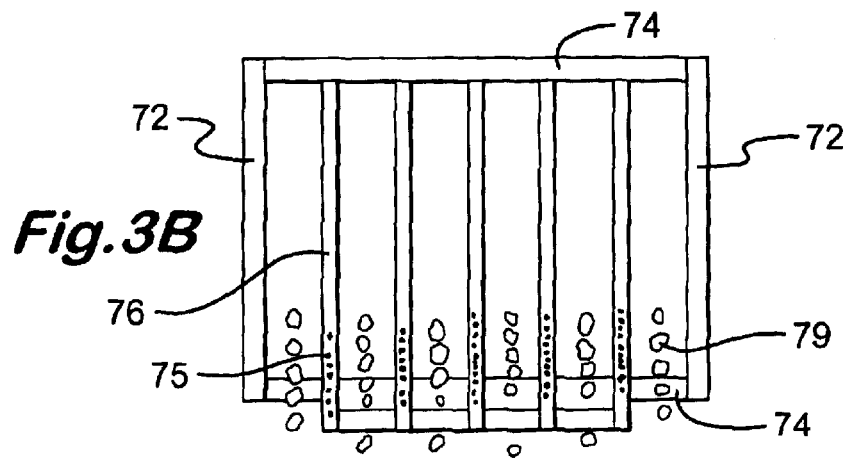
FIG. 3B is a top view of part of the shaker of FIG. 3A.
Figure 3C:
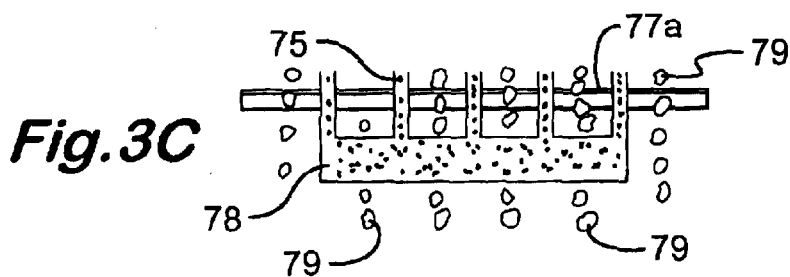
FIG. 3C is an end view of part of the shaker of FIG. 3A.

The present invention discloses, in at least certain aspects, a shale shaker (or vibratory separator) 71 with an apparatus as shown in FIGS. 3A–3C which has upright walls or separation members 70 between side walls 72 and end walls 74 which channel the flow of relatively small particles flowing along a path above support members 76 on top of a screen 77 on the vibratory separator. The relatively small particles 75 flow between the walls and then into a common receptacle 78. Relatively larger particles 79 that flow on screening areas that are not above supports 76 for the screen flow off the end of the screen and do not flow into the common receptacle 78 into which the relatively smaller particles 75 flow. Alternatively no common receptacle is used and each flow line or flow path has its own collector. A typical prior art screen or screens (e.g. as shown in FIGS. 2A–2E) may be used on the vibratory separator. Such a screen has a plurality of spaced-apart support ribs or members. For clarity screen mesh 77a of the screen 77 is not shown in FIG. 3B.

Figure 4A:
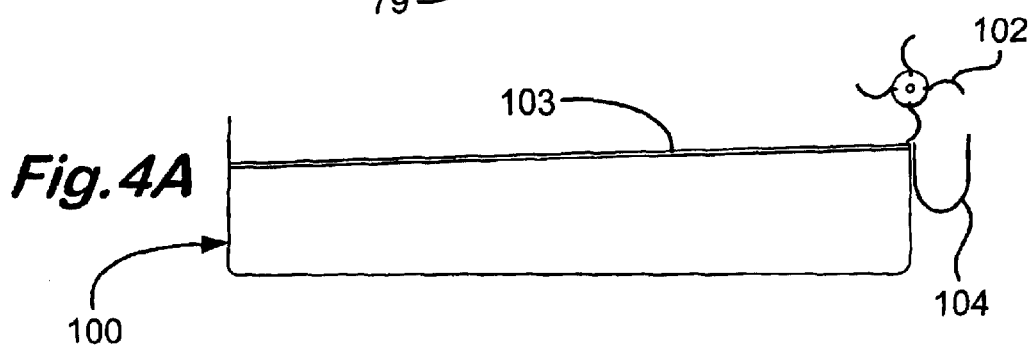
FIG. 4A is a side view of a shaker according to the present invention.
Figure 4B:
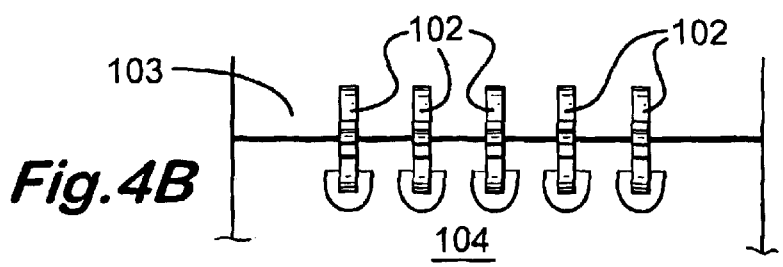
FIG. 4B is an end view of part of the shaker of FIG. 4A.

FIGS. 4A and 4B show a shale shaker (or vibratory separator) 100 which has a plurality of scoop apparatuses 102 mounted adjacent the end of the shaker above an end screen assembly 103 (which may be like the screen of FIG. 2A). The scoop apparatuses 102 are positioned so that they scoop off the relatively small particles from the lines or paths in which they are flowing, preferably at a point prior to the particles flowing off the end of the screen. Alternatively, the scoop apparatuses 102 are located above the paths of flow of the relatively larger particles which are scooped off; or scoops are used for both size particles. Also, it is within the scope of the present invention to provide scoop apparatuses further inward of the shaker, i.e., not at the end of the last screen, so that material is scooped off at any desired point in the shaker (or separator). The scoop apparatuses dump material into receptacles 104.

Figure 5A:
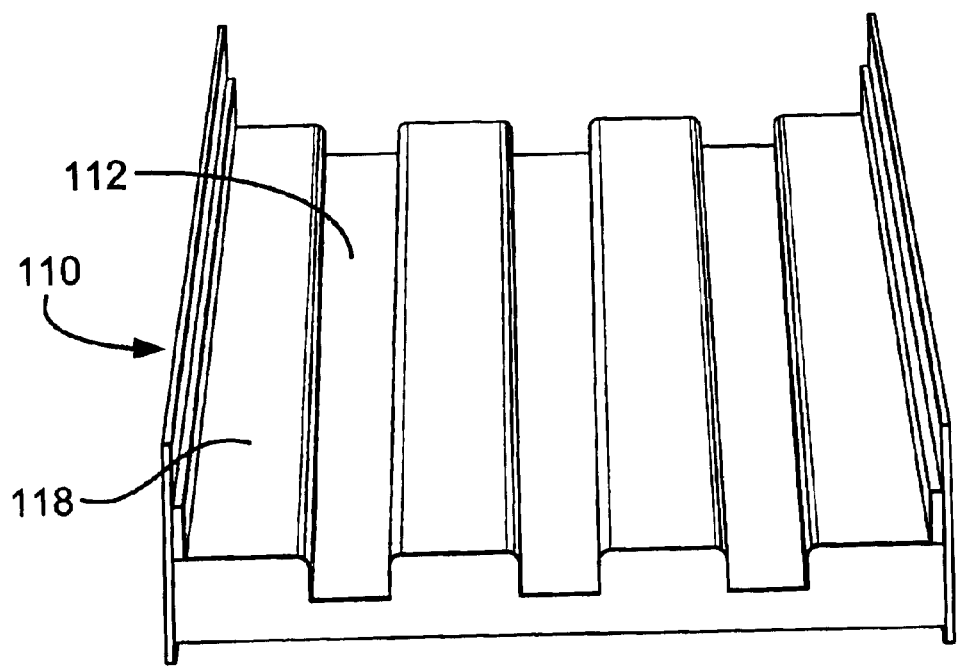
FIG. 5A is a perspective view of a trough apparatus according to the present invention.
Figure 5B:
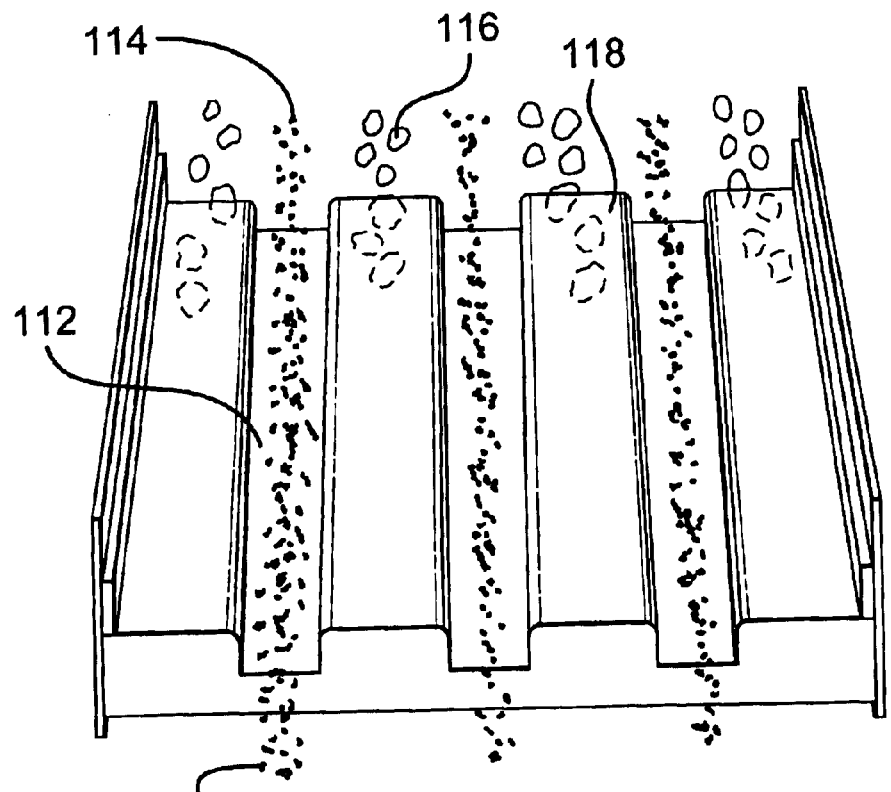
FIG. 5B is a perspective view showing material flowing on the trough of FIG. 5A.

As shown in FIG. 5A, a trough device 110 according to the present invention has a plurality of spaced-apart troughs 112 which are sized, configured, and positioned so that relatively smaller particles 114 (see FIG. 5B) flow into the troughs 112 while relatively larger particles 116 flowing off the end of a shaker (or separator) screen flow down upper parts 118 and are not intermingled with the relatively smaller particles 114 in the troughs 12. The relatively smaller particles 112 may be collected for disposal or for further processing. Alternatively, the trough is positioned so that the smaller particles flow under the end of the trough and the larger particles progress into, on and through the troughs. In another aspect, not shown, there are multiple side-by-side troughs for each flow path from the top of the screen, for both sizes of particles. Any screen assembly or device according to the present invention, including but not limited to those of FIGS. 3B–5B, may have any frame end area structure or cover according to the present invention, including, but not limited to, as shown in FIGS. 6A–11.

The present invention, therefore, provides in at least certain embodiments, a screen assembly for a vibratory separator with a frame or other support with a plurality of openings therethrough, the frame having a material exit end, screening material on the frame over the openings, the frame having an end area at the material exit end of the frame, and end apparatus or structure at the end area for facilitating material movement over the end area. Such a screen assembly may have one or some (in any possible combination) of the following: said end apparatus or structure with a a roughened end area and/or having a layer of material (e.g., but not limited to screening material or fabric); wherein the layer of material is material from the group consisting of natural fabric, synthetic fabric, woven web, air laid web, and releasably cooperating fastener material; wherein the layer of material is connected to the frame or support by connection apparatus and/or material from the group consisting of adhesive, glue, epoxy, screws, bolts, plugs, and rivets; wherein the end structure or apparatus has a width, the end area has a width, and the width of the end structure or apparatus is substantially equal to the width of the end area; wherein the end structure or apparatus has a width, the end area has a width, and the width of the end structure or apparatus is less than the width of the end area; wherein the end structure or apparatus (henceforth "end structure") has a width, the end area has a width, and the width of the end structure is less than the width of the end area and the width of the end structure increases toward a boundary of the end area; wherein the roughened end area has roughened portions with areas about $\frac{1}{16}$ inch deep; wherein the roughened end area has roughened portions in a pattern; wherein the roughened end area has roughened portions randomly located on the end area; wherein the screening material is a plurality of layers of screening material; wherein the end structure is hardened material, and, in one aspect, a plurality of spaced-apart amounts of such material; wherein the hardened material is from the group consisting of glue, epoxy, silicone and adhesive; wherein adhesive material connects the screening material to the frame or other support, the screening material having a top surface, portions of the adhesive material at the top surface of the screening material, solids movable on the portions of the adhesive material, the portions of the adhesive material having portion structure and/or apparatus (henceforth "portion structure") for impeding the movement of solids on the portions and/or for directing them off such portions (and the end area structure or apparatus for facilitating the movement of solids or material off a screen may be, according to the present invention, optional with such a screen assembly that has such portion structure); wherein the portion structure is at least one roughened area on the portions of the adhesive material; wherein said at least one roughened area is a plurality of spaced-apart roughened areas; wherein the portion structure is hardened material projecting upwardly; wherein said hardened material is a plurality of spaced-apart amounts of hardened material; wherein the portion structure is a layer of material over at least a part of the portions of adhesive material; and/or wherein the portion structure directs solids off the portions of adhesive material. The present invention also provides a vibratory separator or shale shaker with one or more of any such screen assemblies and methods for using them.

In conclusion, therefore, it is seen that the present invention and the embodiments disclosed herein and those covered by the appended claims are well adapted to carry out the objectives and obtain the ends set forth. Certain changes can be made in the subject matter without departing from the spirit and the scope of this invention. It is realized that changes are possible within the scope of this invention and it is further intended that each element or step recited in any of the following claims is to be understood as referring to all equivalent elements or steps. The following claims are intended to cover the invention as broadly as legally possible in whatever form it may be utilized. The invention claimed herein is new and novel in accordance with 35 U.S.C. § 102 and satisfies the conditions for patentability in § 102. The invention claimed herein is not obvious in accordance with 35 U.S.C. § 103 and satisfies the conditions for patentability in § 103. This specification and the claims that follow are in accordance with all of the requirements of 35 U.S.C. § 112. The inventor may rely on the Doctrine of Equivalents to determine and assess the scope of their invention and of the claims that follow as they may pertain to apparatus not materially departing from, but outside of, the literal scope of the invention as set forth in the following claims.

What is claimed is:

1. In a vibratory separator, a screen assembly comprising
   a support with a plurality of openings therethrough, a frame having a material exit end,
   screening material on the support over the openings,
   the support having an end area at the material exit end of the frame, and
   end means at the end area for facilitating material movement over the end area.

2. The screen assembly of claim 1 wherein said end means comprises a roughened end area.

3. The screen assembly of claim 1 wherein said end means comprises a layer of material connected to the support over at least a portion of the end area.

4. The screen assembly of claim 3 wherein the layer of material is screening material.

5. The screen assembly of claim 3 wherein the layer of material is material from the group consisting of natural fabric, synthetic fabric, woven web, air laid web, and releasably cooperating fastener material.

6. The screen of assembly of claim 3 wherein the layer of material is connected to the support by connection means from the group consisting of adhesive, glue, epoxy, screws, bolts, plugs, and rivets.

7. The screen assembly of claim 1 wherein the end means has a width, the end area has a width, and the width of the end means is substantially equal to the width of the end area.

8. The screen assembly of claim 1 wherein the end means has a width, the end area has a width, and the width of the end means is less than the width of the end area.

9. The screen assembly of claim 1 wherein the end means has a width, the end area has a width, and the width of the end means is less than the width of the end area and the width of the end means increases toward a boundary of the end area.

10. The screen assembly of claim 2 wherein the roughened end area has roughened portions with areas about 1/16 inch deep.

11. The screen assembly of claim 2 wherein the roughened end area has roughened portions in a pattern.

12. The screen assembly of claim 2 wherein the roughened end area has roughened portions randomly located on the end area.

13. The screen assembly of claim 1 wherein the screening material comprises a plurality of layers of screening material.

14. The screen assembly of claim 1 wherein the end means is an amount of hardened material.

15. The screen assembly of claim 14 wherein the hardened material is from the group consisting of glue, epoxy, silicone and adhesive.

16. The screen assembly of claim 1 wherein adhesive material connects the screening material to the support, the screening material having a top surface, portions of the adhesive material at the top surface of the screening material, solids movable on said portions of the adhesive material, said portions of the adhesive material having portion means for impeding the movement of solids on said portions.

17. The screen assembly of claim 16 wherein said portion means comprises at least one roughened area on said portions of the adhesive material.

18. The screen assembly of claim 17 wherein said at least one roughened area comprises a plurality of spaced-apart roughened areas.

19. The screen assembly of claim 16 wherein said portion means comprises hardened material projecting upwardly.

20. The screen assembly of claim 19 wherein said hardened material comprises a plurality of spaced-apart amounts of hardened material.

21. The screen assembly of claim 16 wherein said portion means comprises a layer of material over at least a part of said portions of adhesive material.

22. The screen assembly of claim 16 wherein said portion means directs solids off said portions of adhesive material.

23. The screen assembly of claim 1 wherein said support is selected from the group consisting of frame, perforated plate and strip support.

24. A screen assembly for a vibratory separator comprising
   a frame with a plurality of openings therethrough, the frame having a material exit end,
   screening material on the frame over the openings,
   the frame having an end area at the material exit end of the frame, and
   end means at the end area for facilitating material movement over the end area, and
   wherein adhesive material connects the screening material to the frame, the screening material having a top surface, portions of the adhesive material at the top surface of the screening material, solids movable on said portions of the adhesive material, said portions of the adhesive material having portion means for impeding the movement of solids on said portions.

* * * * *